Feb. 28, 1928.

E. E. WAITE 1,661,102

ENDED CORD AND METHOD OF PRODUCING THE SAME

Original Filed Feb. 28, 1924

INVENTOR
E. E. WAITE.
BY
ATTORNEYS

Patented Feb. 28, 1928.

1,661,102

UNITED STATES PATENT OFFICE.

EDWIN E. WAITE, OF FRAMINGHAM, MASSACHUSETTS, ASSIGNOR TO DRIVER-HARRIS COMPANY, OF HARRISON, NEW JERSEY, A CORPORATION OF NEW JERSEY.

ENDED CORD AND METHOD OF PRODUCING THE SAME.

Original application filed February 28, 1924, Serial No. 695,638. Divided and this application filed April 20, 1925. Serial No. 24,668.

My invention relates to an ended cord and the method of winding the same more especially a conducting cord having two separated portions wound so as to secure the fibers of the insulation about the conductors and prevent them from unraveling or loosening.

It has for its object to produce a cord having a winding such that it will be possible to perform by a machine work heretofore done by hand. It further has for its object to produce a method whereby this work can be done more expeditiously so as to save both time and labor. It further has for its object to provide a multiple strand conducting cord with a winding progressing successively to several free ends. It further has for its object to supply the multiple strand conducting cord end with a single continuous winding which partly embraces all members of the cord near its end and extends separately on to the free ends. It further has for its object to attain other advantages hereinafter pointed out.

Before the invention of my cord and method it was customary to wind each end separately, tying the ends of the windings upon the separate ends and then to wind the body of the cord with a separate winding and tie the ends of the winding thereon, making it necessary in a two-strand conductor to apply three separate windings and to tie three knots, one for each winding. By my invention it becomes necessary to secure only one free end and furthermore the method, as above described, is adapted to be carried out mechanically by the machine described in my pending application Serial No. 695,638, filed February 28, 1924 of which this application is a division.

The following is a description of a cord embodying and made in accordance with my invention, reference being had to the accompanying drawings, in which.

Figure 1:
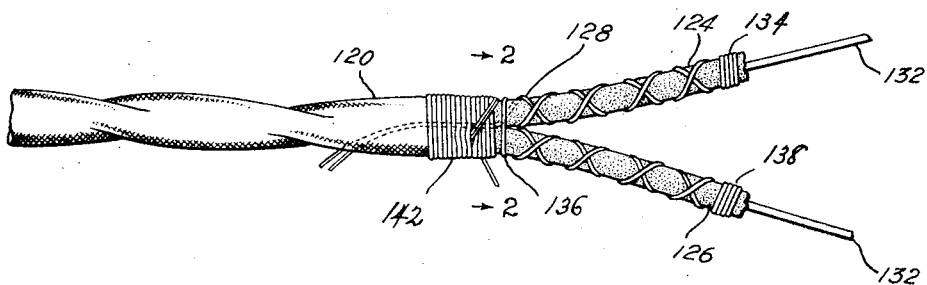
Figure 1 shows a two-stranded flexible conductor cord made in accordance with my invention.
Figure 2:
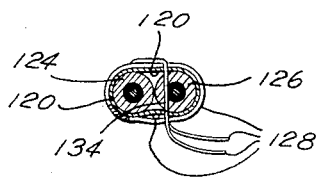
Fig. 2 is a section of the same on the line 2—2, Fig. 1.
Figure 3:
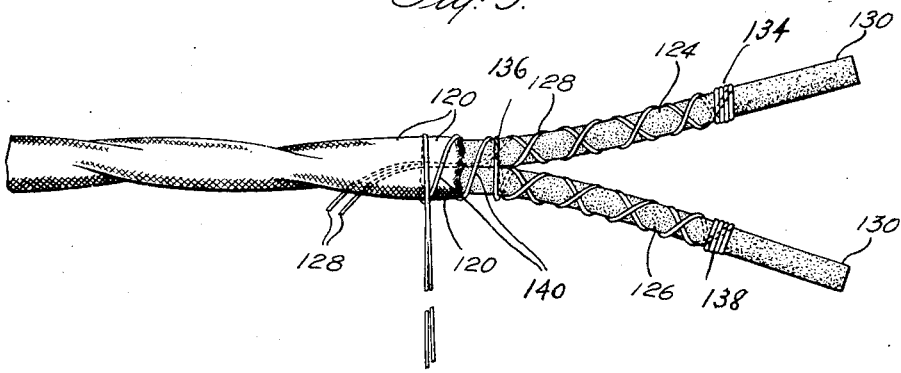
Fig. 3 shows the cord of Fig. 1 at an intermediate stage of its winding.

Referring more particularly to the drawings, Fig. 1 shows a two-strand cord having electrical conductors 132—132 surrounded by insulation 124 and 126, such for instance, as asbestos, braided or otherwise applied, covering layers of rubber or the like disposed adjacent to the conductors. Two strands covered with the insulation 124 and 126 are covered with a single sheath 120 braided or otherwise formed thereon in the ordinary manner. 128 is a two-strand winding which is preferably of non-conducting material and consists of a continuous thread, one end of which is laid against the sheath. The thread is then wound around and outwardly along the upper leg for the desired distance, as shown in Fig. 3, the turns being spaced apart as it proceeds along said leg, as shown. The progressive movement of the winding is then reversed so as to form a superimposed layer of winding and the turns are brought close together for a few turns as shown at 134 and then spaced apart as the winding continues to return along said leg. The turns of the external or second layer cross above the turns of the first layer, as shown in said Fig. 3. When it reaches the point where the two legs separate it is brought up and over both strands of the cord, as shown at 136, and then brought up around the other leg and wound outwardly along that leg, being spaced apart for a distance and then wound progressively backward along that leg, the turns of the resulting superimposed layer being close spaced at the end as shown at 138 and then spaced apart. The return or superimposed winding here also covers and crosses the first winding. When the winding on the second leg returns to the point where the two legs separate it is again brought over both strands and wound about the body of the cord with an open winding for a few turns, as shown at 140 in Fig. 3, and then wound backward over said open spaced winding with a close winding, as shown at 142, Fig. 1. The free end of the cord is then by means of a hook or needle passed through the wound section 142, as shown in Fig. 2, thus completing the operation and producing a cord with a fastened winding embodying my invention.

Before the winding operation begins a portion of the sheath 120, if a sheath is present, is stripped off, as shown in Fig. 3, and after the winding operation is completed the insulation on the unwound ends 130 (Fig. 3) is stripped off so as to leave the conductors 132 bare, as shown in Fig. 1.

The close spacing of portions of the superimposed layers as described insures stability in the winding as a whole. So long as these portions are close wound the primary layers may be open spaced throughout their lengths, if desired.

From the foregoing it will be seen that the winding is a continuous winding from end to end and that it progresses outwardly and inwardly in a proper manner along the various portions of the cord to produce the desired result, the winding always being in the same direction, i. e. in the present instance, looking at the end of the cord, in a counter-clockwise direction. This winding can be performed by hand and when fastened as described eliminates the knotting heretofore necessary in the old method of winding and as stated can be applied by the machine of my application, Serial No. 695,638, above referred to.

As will be evident to those skilled in the art, my invention permits of various modifications without departing from the spirit thereof or the scope of the appended claims.

What I claim is:

1. The method of winding the ends of a cord having two free ends which consists in laying a thread upon said cord at the point where said free ends are to separate, winding the thread outwardly around one free end and then inwardly around said end to said separating point, and then winding the thread outwardly around the other free end and then inwardly around said end to said point.

2. The method of winding the ends of a cord having two free ends which consists in laying a thread upon said cord at the point where said free ends are to separate, winding the thread outwardly around one free end and then inwardly around said end to said separating point, and then winding the thread outwardly around the other free end and then inwardly around said end to said point, and then winding said thread around the body of the cord adjacent to said point.

3. The method of winding the ends of a cord having two free ends which consists in laying a thread along said cord at the point where said free ends are to separate, winding the thread outwardly around one end and then inwardly around said end to said separating point, winding the thread outwardly around the other end and then inwardly around said end to said point, spacing the turns of the superimposed winding so as to produce close windings at points adjacent to the outer ends of the winding and open windings at other points.

4. The method of winding the ends of a cord having two free ends which consists in laying a thread along said cord at the point where said free ends are to separate, winding the thread outwardly around one end and then inwardly around said end to said separating point, winding the thread outwardly around the other end and then inwardly around said end to said point, and then around the body of the cord, spacing the turns of said winding so as to produce close windings at points adjacent to the outer ends of the end windings and open windings at other points, and spacing the finishing windings around the body of the cord close together.

5. A cord having two separate legs, and means for finishing said legs comprising a continuous winding starting at the point of separation of said legs, and extending first out one leg and back to its starting point, then out the other leg and back to its starting point, and then around the body portion of the cord.

6. A cord having two separate legs, and means for finishing said legs comprising a continuous winding starting at the point of separation of said legs, and extending first out one leg and back to its starting point, then out the other leg and back to its starting point, and then around the body portion of the cord, said continuous winding having successive turns at the outer ends of its traverses along said legs closer together than other turns upon said legs.

7. A cord having two separate legs, and means for finishing said legs comprising a continuous winding, starting at the point of separation of said legs, and extending first out one leg and back to its starting point, then out the other leg and back to its starting point, and then around the body portion of the cord, the turns of said continuous winding at the outer ends of its return traverse along said legs being closer together than other turns upon said legs, and the final turns around the body portion of said cord being close together.

8. A two-strand conducting cord having a body portion and two leg portions extending from said body portion, a continuous winding starting at a point adjacent to said body portion and extending from and then toward said point first along said legs successively and then along said body portion forming two layers upon said legs and body portion, the outer layers having close spaced turns.

9. A two-strand conducting cord having